Patented Aug. 5, 1952

2,606,199

UNITED STATES PATENT OFFICE 2,606,199

NONIONIC SURFACE ACTIVE AGENT

Roy Herman Kienle, Bound Brook, and Gordon Putnam Whitcomb, Watchung, N. J., assignors to American Cyanamid Company, New York, N. Y., a corporation of Maine No Drawing. Application December 20, 1947, Serial No. 793,040

12 Claims. (Cl. 260—407)

1

This invention relates to non-ionic surface active agents and particularly to such agents possessing pronounced hydrotropic and/or dispersing properties for mixtures of cationic and anionic organic compounds.

Wetting and dispersing agents having various types of surface activity are well known. Some of these contain surface active cations and others surface active anions. As a result some are suitable for dispersing certain types of material and others for different types and in general they are not interchangeable.

In preparing many dispersions either a cationic or anionic surface active compound is suitable but there are certain operations, for example, the dyeing of metallized dyestuffs in which it is important to have a non-ionic compound capable of dispersing either cationic or complexes formed therewith. Notable difficulty is encountered in the dyeing of metallized dyestuffs which are anionic in character, when cationic active agents are used to improve their penetration. Such mixtures tend to form a precipitate, thus producing an objectionable scum on the surface and sides of the dye-bath which may cause spotting of the material to be dyed. In such a case it is necessary to provide a non-ionic surface active agent with hydrotropic and/or dispersing power in order to maintain the dispersion of both the cationic and anionic constituents of the bath. Other instances requiring a non-ionic surface active agent are also encountered in the field of emulsions and dispersions, dyeing of vinyl halide-acetate copolymers, and so forth.

The present invention is directed to a new type of compound which is non-ionic and contains both oil soluble and water soluble groups and is capable of exerting strong hydrotropic, that is to say, solubilizing action on many anionic and cationic compounds in the same water solution. New compounds of the present invention are high molecular weight half-esters of dimerized long chain fatty acids with high molecular weight polyalkylene oxides obtained by the polymerization of alkylene oxides under suitable conditions. The polyalkylene oxides may be considered as polyglycols, that is to say, dihydric alcohols with very long ether chains connecting the terminal hydroxyl groups. A type formula of the most common polyalkylene oxide, polyethylene oxide is as follows:

$$HOC_2H_4O(C_2H_4O)_nC_2H_4OH$$

The dimeric acids, the polyglycol esters of which are described and claimed in the present

2 application, are obtained by heat polymerization of polyunsaturated fatty acids. They are essentially dicarboxylic acids of the alicyclic series. The structural formulas assigned to these dimerized fatty acids are set out in an article, volume 32, of Industrial and Engineering Chemistry, page 802. The esters may, therefore, be represented generally by the following formula:

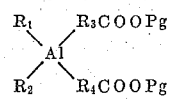

in which Al is an alicyclic unsaturated ring, either a cyclohexene or a hexahydronapthalene ring, $R_1$ and $R_2$ are aliphatic hydrocarbon radicals of the formula $C_nH_{2n+1}$ or $C_nH_{2n-1}$, $R_3$ and $R_4$ are aliphatic hydrocarbon radicals of the formula $C_nH_{2n}$ or $C_nH_{2n-2}$, Pg is a polyglycol of molecular weight at least 1500 or hydrogen, at least one of the Pg radicals being a polyglycol and at least one of the R's being saturated. In the case of other polyalkylene oxides the alkylene groups will have the corresponding number of carbon atoms. The dimerized acids contain two carboxylic acid groups and the proportions of polyalkylene oxide and dimerized acids are more than one and preferably approximately two mols of polyalkylene oxide per mol of dimerized acid. This results in producing esters having free hydroxyl groups and the presence of these free hydroxyl groups is an essential characteristic of the compounds of the present invention to which they owe much of their water solubility and hydrotropic powers. The half-esters of the present invention containing free hydroxyl groups are wax-like solids which, at high temperatures, melt to form oils.

The invention is not limited to particular processes of preparing the compounds in so far as the new compounds themselves are concerned. It is preferred, however, to prepare the compounds by a reaction of the dimeric fatty acid and polyalkylene oxide at elevated temperatures in the presence of a small amount of an esterification catalyst such as, for example, concentrated sulfuric acid.

It is an advantage of the present invention that reaction conditions are not critical and a considerable range of temperature is suitable, excellent results being obtained at about 140–150° C. It is also not necessary that the polyalkylene oxide and acid be in exactly stoichiometrical proportions although it is ordinarily preferable to use substantially stoichiometrical proportions in order to obtain maximum yields.

While the partial esters containing free hydroxyl groups are the essential feature of the present invention, compounds may be prepared which are mixed esters of the dimerized acids and monomeric fatty acids, the latter being present usually in minor amount and normally not exceeding 50%. The monomeric acids may be the same as the ones used in the formation of the dimerized acids or they may be different acids. These mixed compounds are similar in character to the ones in which all of the acid component is dimerized acid and may readily be prepared either by reacting the monomeric acid with a condensation product of the polyalkylene oxide and the dimeric acid or preferably by reacting the polyalkylene acid with a mixture of dimeric and monomeric acids. In such cases the molecular proportion of polyalkylene oxide to the acids will be less than two because the monomeric acid contains only a single carboxylic acid group.

Most of the products of practical importance are prepared with the polyethylene oxides because these are the most readily obtained polyalkylene oxides and are the cheapest but similar compounds may be prepared from other water soluble polyalkylene oxides, for example, polypropylene oxides. The degree of polymerization of the polyalkylene oxide is not critical but the best products are obtained with a polyethylene oxide having a molecular weight of the order of 4000.

The invention will be described in greater detail in conjunction with the following specific examples. All parts are by weight unless otherwise noted.

*Example 1*

21 parts (one molecular proportion) of an unhydrogenated dimeric, dibasic, fatty acid obtained by heat-treating the fatty acid of soybean oil and vacuum distilling off the monomeric acid, are condensed with 300 parts (two molecular proportions) of polyethylene oxide of molecular weight 4000 in the presence of 6 parts (2% based on the weight of the polyethylene oxide) of sulfuric acid (specific gravity 1.83). The reactants are heated for 2 hours at about 140° C. The product is a brown, oil liquid which solidifies on cooling to a hard, wax-like solid. This may be pulverized to a whitish powder. The ester prepared in this way possesses dispersing, wetting and emulsifying properties and is soluble in water, benzene, ethyl alcohol, acetone and ethyl acetate. The fatty acids are mixtures of the dimers of the polyunsaturated acids from soy bean oil of which octadecadiene carboxylic acid is the principal one. This results in an ester of the following formula:

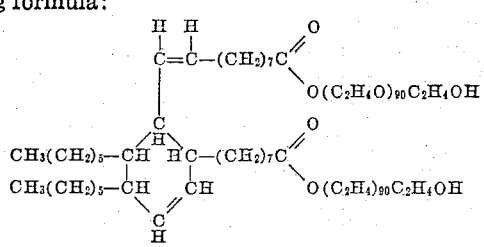

*Example 2*

3.5 parts (one molecular proportion) of an unhydrogenated dimeric, dibasic, fatty acid prepared as in Example 1 but obtained from castor oil and 50 parts (two molecular proportions) of polyethylene oxide of molecular weight 4000, are heated for two hours at about 140° C. in the presence of one part of sulfuric acid (specific gravity 1.83). The hard, wax-like condensation product has emulsifying, wetting, and dispersing properties similar to those of Example 1 and is soluble in the same solvents. The esters are mixtures of the dimers of the polyunsaturated acids of castor oil. The esters from the dimers of trienic acids have the following formula:

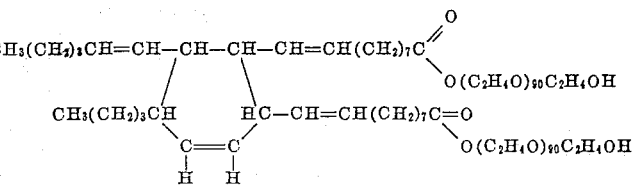

and the esters of the dimerized octadeca dienic acids present have the formula of Example 1.

*Example 3*

3.5 parts (one molecular proportion) of an unhydrogenated polymeric, polybasic, fatty acid obtained as in Example 1 but from linseed oil, are condensed with 50 parts (2 molecular proportions) of polyethylene oxide of molecular weight 4000, by heating for 2 hours at about 140° C. in the presence of 1 part of sulfuric acid (specific gravity 1.83). The product, a hard, waxlike solid, possesses wetting, dispersing and emulsifying properties similar to those of Example 1 and is soluble in the same solvents. The esters have the same formula as those of Example 2.

*Example 4*

3.5 parts (one molecular proportion) of an unhydrogenated, polymeric, polybasic fatty acid prepared as in Example 1 but from tung oil, are heated for 2 hours at about 140° C. with 50 parts (2 molecular proportions) of polyethylene oxide of molecular weight 4000 and one part of sulfuric acid (specific gravity 1.83). The hard, wax-like condensation product has dispersing, wetting, and emulsifying properties similar to those of Example 1 and is soluble in the same solvents. The esters of the dimerized octadeca trienic acids have the hydrogenated naphthalene ring represented by the following formula:

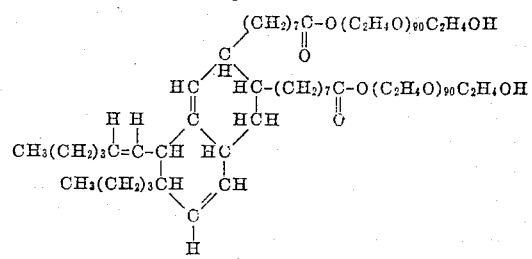

The esters of the other dimerized acids have the formulas of Examples 1 to 3.

*Example 5*

3.5 parts (one molecular proportion) of an unhydrogenated polymeric, polybasic fatty acid, comprising the still residue from the fractional distillation of the isomerized fatty acids of linseed oil, separated as mixed fatty acids after autoclaving linseed oil with aqueous caustic soda, are condensed with 50 parts (two molecular proportions) of polyethylene oxide of molecular weight 4000 by heating 2 hours at 130-140° C. in the presence of one part of sulfuric acid (specific gravity 1.83). The ester prepared in this way possesses wetting, emulsifying, and dispersing properties similar to those of Example 1 and is soluble in the same solvents. The esters have the same formula as those of Example 3.

*Example 6*

3.5 parts of a mixture of unhydrogenated monomeric and dimeric fatty acids obtained by heat polymerizing the mixed fatty acids from soybean oil are heated from 2 hours at about 140° C. with 37.5 parts of polyethylene oxide of molecular weight 4000 and 0.75 parts of sulfuric acid (specific gravity 1.83). The ester prepared in this way possesses wetting, emulsifying and dispersing properties similar to those of Example 1 and is soluble in the same solvents. The esters have the formula of Example 1.

*Example 7*

3.1 parts (one molecular proportion) of an hydrogenated, dimeric, dibasic fatty acid obtained by catalytically hydrogenating the polymeric fatty acids remaining after removing the monomeric acids from the thermal polymerization product of the fatty acids of castor oil, are heated for two hours at about 140° C. with 25 parts (3 molecular proportions) of polyethylene oxide of molecular weight 1500 and 0.5 parts of sulfuric acid (specific gravity 1.83). The product, a paste-like solid, has dispersing, wetting and emulsifying properties similar to those of Example 1 and is soluble in the same solvents. The esters have the same formula as Example 3 except that the polyglycol radical is $((C_2H_4O)_{33}C_2H_4OH)$.

*Example 8*

5 parts (one molecular proportion) of an unhydrogenated polymeric, polybasic, fatty acid obtained by removing via distillation the monomeric fatty acids after thermally polymerizing the fatty acids of linseed oil, are heated for 2 hours at about 140° C. with 27 parts (2 molecular proportions) of polyethylene oxide of molecular weight 1500 and 0.54 parts of sulfuric acid (specific gravity 1.83). The condensation product, a paste-like solid, possesses emulsifying, wetting, and dispersing properties similar to those of Example 1 and is soluble in the same solvents. The esters have the formula of Example 7.

*Example 9*

A water soluble polyalkylene oxide of approximately 1700 molecular weight is prepared by reacting 6.5 parts (12 molecular proportions) of propylene oxide with 14 grams (one molecular proportion) of polyethylene oxide of molecular weight 1500, for two and one half hours at about 125° C. in the presence of 1% concentrated sulfuric acid (based on the weight of the polyethylene oxide).

12 parts (2 molecular proportions) of the polyalkylene oxide are condensed with 2 parts (one molecular proportion) of a polymeric, polybasic, fatty acid obtained from the fatty acids of linseed oil, as per Example 8, by heating for two hours at about 130° C. in the presence of 2% concentrated sulfuric acid (based on the weight of polyalkylene oxide).

The product, a dark brown, pasty solid, possesses wetting, emulsifying, and dispersing properties similar to those of Example 1, and is soluble in the same solvents.

We claim:
1. An ester of a dimeric alicyclic dicarboxylic acid having the formula:

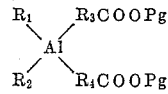

in which Al is selected from the group of cyclohexene and hexahydronaphthalene, $R_1$ and $R_2$ are hydrocarbon radicals selected from the group consisting of $C_nH_{2n+1}$ and $C_nH_{2n-1}$, $R_3$ and $R_4$ are hydrocarbon radicals selected from the group consisting of those having the formula $C_nH_{2n}$ and $C_nH_{2n-2}$, at least one of the R's being saturated and Pg is selected from the group consisting of polyglycol radicals having a molecular weight of at least 1500 and hydrogen, at least one of the Pg's being a polyglycol radical, the esters being soluble in water and possessing dispersing, wetting and emulsifying properties.

2. An ester according to claim 1 in which both of the radicals Pg are polyglycol radicals.

3. An ester according to claim 2 in which the polyglycol is polyethylene glycol.

4. An ester according to claim 1 in which the polyglycol is polyethylene glycol.

5. An ester according to claim 4 in which the polyglycol radical has a molecular weight of the order of 4,000, the product being a wax-like solid and being soluble in aromatic carbons, paraffin alcohols, ketones and esters as well as in water.

6. An ester according to claim 5 in which the dimeric acid is the dimer of the polyunsaturated fatty acids of soy bean oil.

7. An ester according to claim 5 in which the dimeric acid is the dimer of the polyunsaturated fatty acids of castor oil.

8. An ester according to claim 5 in which the dimeric acid is the dimer of the polyunsaturated fatty acids of linseed oil.

9. An ester according to claim 5 in which the polyglycol radical has a molecular weight of the order of 4,000, the product being a wax-like solid and being soluble in aromatic carbons, paraffin alcohols, ketones and esters as well as in water.

10. An ester according to claim 9 in which the dimeric acid is the dimer of the polyunsaturated fatty acids of soy bean oil.

11. An ester according to claim 9 in which the dimeric acid is the dimer of the polyunsaturated fatty acids of castor oil.

12. An ester according to claim 9 in which the dimeric acid is the dimer of the polyunsaturated fatty acids of linseed oil.

ROY HERMAN KIENLE.
GORDON PUTNAM WHITCOMB.

REFERENCES CITED

The following references are of record in the file of this patent:

UNITED STATES PATENTS

| Number | Name | Date |
|---|---|---|
| 1,990,615 | Rodrian et al. | Feb. 12, 1935 |
| 2,162,971 | Ralston | June 20, 1939 |
| 2,174,760 | Schuette et al. | Oct. 3, 1939 |
| 2,269,529 | Goldsmith | Jan. 13, 1942 |
| 2,275,494 | Bennett | Mar. 10, 1942 |
| 2,373,015 | Cowan et al. | Apr. 3, 1945 |
| 2,424,588 | Sparks et al. | July 29, 1947 |

FOREIGN PATENTS

| Number | Country | Date |
|---|---|---|
| 496,166 | Great Britain | Nov. 25, 1938 |